M. COLBY.
DIRECTION INDICATOR.
APPLICATION FILED JULY 7, 1916.
1,238,638.
Patented Aug. 28, 1917.
2 SHEETS—SHEET 1.
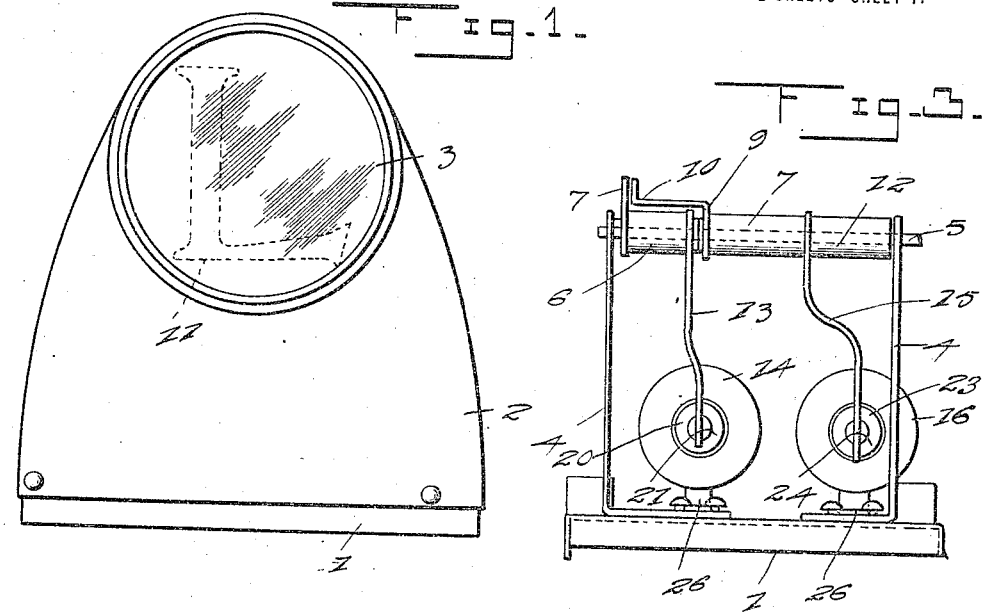
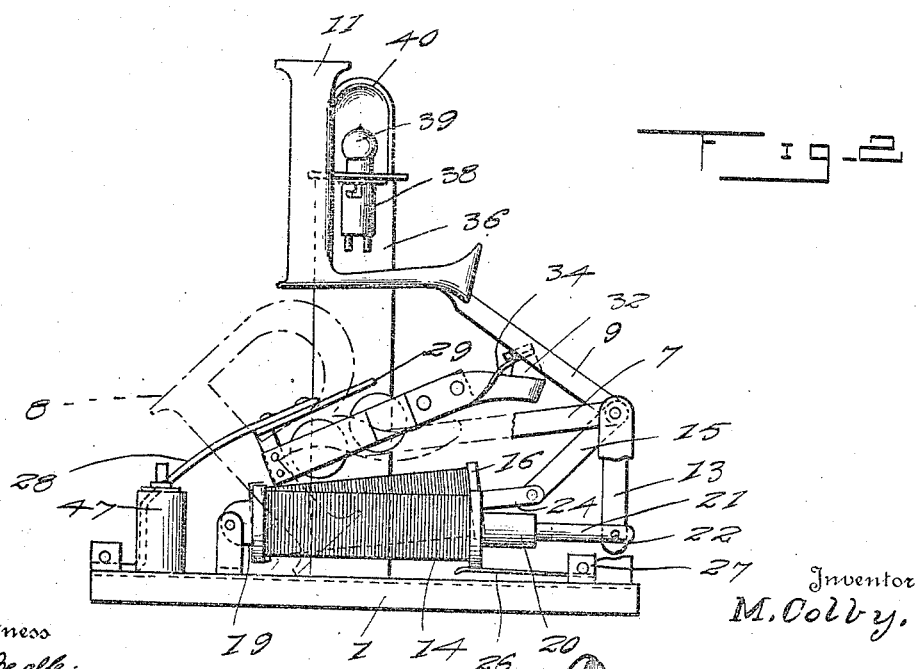
Witness
CBBeall.
Wm F Davidson
Inventor
M. Colby.
By
Attorney

M. COLBY.
DIRECTION INDICATOR.
APPLICATION FILED JULY 7, 1916.

1,238,638.

Patented Aug. 28, 1917.
2 SHEETS—SHEET 2.

Witness
Ch Beale
Wm F Davidson

Inventor
M. Colby.

By
N. F. Rudolph Jr.
Attorney

UNITED STATES PATENT OFFICE.

MELVIN COLBY, OF SPRINGDALE, WISCONSIN.

DIRECTION-INDICATOR.

1,238,638.  Specification of Letters Patent.  Patented Aug. 28, 1917.

Application filed July 7, 1916. Serial No. 108,010.

*To all whom it may concern:*

Be it known that I, MELVIN COLBY, a citizen of the United States, residing at Springdale, in the county of Dane and State of Wisconsin, have invented certain new and useful Improvements in Direction-Indicators; and I do hereby declare the following to be a full, clear, and exact description of the invention, such as will enable others skilled in the art to which it appertains to make and use the same.

This invention relates to improvements upon my invention for a direction indicator, as set forth in my application for Letters Patent, filed March 24, 1916, serially numbered 86523, and has for its primary object the provision of a signal adapted for operation when the direction indicating means are moved to a signaling position, whereby the operator may readily determine if the direction indicating means are properly operating.

Another object of this invention is to provide the signal positioned in clear view of the operator of the automobile and so connected with the direction indicating means, that when either of them are moved to a signaling position to notify the traffic in which direction the automobile is going to proceed, the signal will be operated, allowing the operator to determine if the direction indicating means are correctly operating.

A further object of this invention is to provide leaf springs for properly positioning the solenoids which operate the direction indicating means at all times to relieve strain and friction upon the cores thereof which are connected to the direction indicating means when the direction indicating means are moved to signaling position.

A still further object of this invention is the provision of a direction indicator, of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 4:
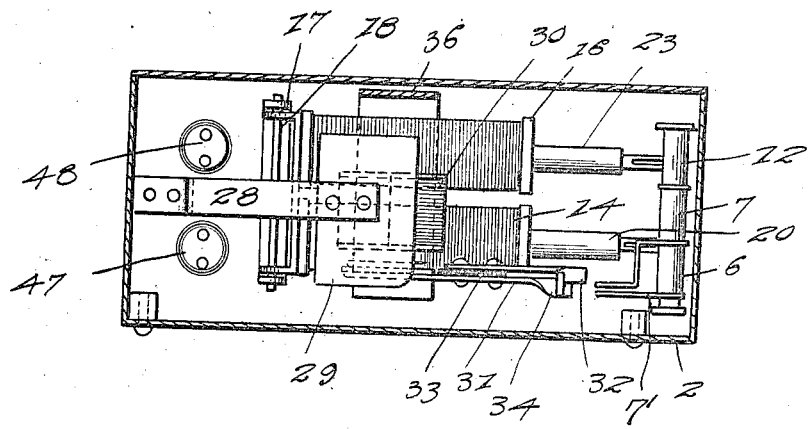
Figure 5:
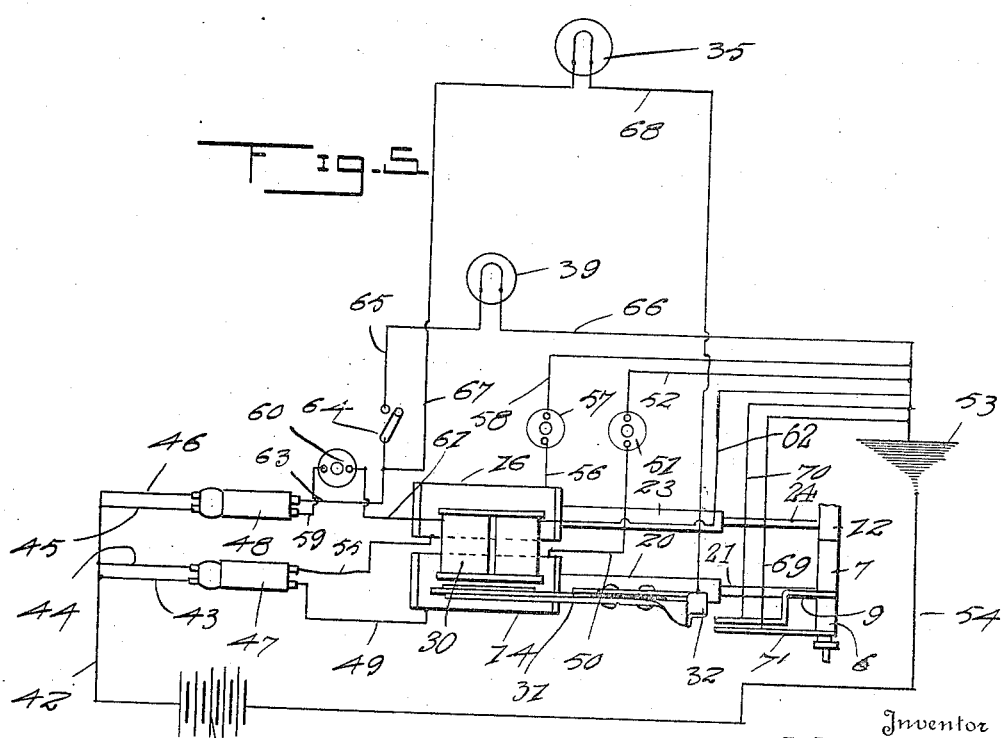

Figure 1 is a front elevation of a direction indicator, constructed in accordance with my invention, Fig. 2 is a front elevation partly in section, illustrating the direction indicating means, one of which is moved to a signaling position, Fig. 3 is an end view, illustrating the connection between the solenoids and the direction indicating means, Fig. 4 is a horizontal sectional view of the same, and Fig. 5 is a plan view of the wiring diagram.

Referring in detail to the drawings, the numeral 1 indicates a base, having detachably secured thereto a casing 2. The upper end of the casing 2 is restricted and has an opening in the front thereof which is closed by a glass window 3.

A pair of vertical standards 4 are secured to one end of the base 1 and have journaled in their upper ends a rod 5 on which are journaled cylindrical members 6 and 7. The member 6 has secured to one end thereof an arm 7', which has secured to its free end the direction indicating symbol 8, which is in the formation of the letter R standing for the word "right," the letter R being struck up from a piece of metal and coated any suitable color. An arm 9 is secured to one end of the member 7 and bent as illustrated at 10 to overlie the member 6 and extend parallel with the arm 7' and has secured to its free end a direction symbol 11, which is in the formation of the letter L, the letter L being struck up from a piece of metal and coated any suitable color. The normal position of the direction indicating symbols 8 and 11 is in an engagement with the base 1 and they are adapted to be swung upwardly so that the direction indicating symbols will be positioned behind the glass window 3, whereby they may be viewed from the exterior of the casing 2. A suitable cylindrical collar 12 is mounted on the rod 5 to properly position the members 6 and 7 thereon. A downwardly depending arm 13 is secured to the member 6 opposite from the end to which the arm 7' is secured and is operatively connected with a solenoid 14, which will be hereinafter more fully described. An arm 15 is secured to the end of the member 7 opposite from the arm 9 and depends downwardly therefrom and is operatively connected with a solenoid 16 which will be hereinafter more fully described. When the solenoids 14 and 16 are energized they will cause the direction indicating symbols 8 and 11 to move upwardly and position themselves in the rear of the window 3, whereby they may be viewed from the exterior of the casing.

A substantially U-shaped bracket 17 is secured to the base 1 at a point adjacent the end of the base opposite to the vertical standards 4 and has secured to the arm portions thereof a rod 18. Journaled upon the rod 18 are suitable brackets 19 which are in turn rigidly secured to one end of each of the solenoids 14 and 16. A core 20 is slidably mounted within the solenoid 14 and has formed on its outer end an extension 21, which is bifurcated to receive the end of the downwardly depending arm 13, which is pivotally secured thereto by a bolt 22. A core 23 is slidably mounted within the solenoid 16 and has formed on its outer end an extension 24 which is bifurcated to pivotally receive the lower end of the arm 15. Thus it will be seen that when the solenoids 14 and 16 are energized, the cores 20 and 23 will be drawn within the solenoids causing the arms 7' and 9 to swing upwardly to display the direction indicating symbols 8 and 11 rearwardly of the window 3. Suitable leaf springs 26 are secured to brackets 27 which are in turn connected to the base 1 and the leaf springs 26 engage the under side of the free ends of the solenoids 14 and 16 for causing the free ends of the solenoids to move upwardly when the arms 7' and 9 swing upwardly upon the energizing of the solenoids, thus relieving strain and friction upon the cores 20 and 23 as they move inwardly and outwardly of the solenoids.

A spring arm 28 is secured to one end of the base 1 adjacent the U-shaped bracket 17 and is bent upwardly in an inclined plane to overlie the solenoids 14 and 16 and has secured to its free end a substantially rectangular plate 29. A pair of magnets 30 are secured to the under side of the plate 29 and are connected in series. A spring arm 31 is secured to one edge of the plate 29 by a downwardly depending extension and overlies the ends of the pair of magnets 30. The free end of the resilient arm 31 has a catch 32 secured thereto and insulated therefrom by an insulation block 33. The free end of the resilient arm 31 is bent to form a contact finger 34. By energizing the pair of magnets 30, the resilient arm 31 will be drawn in the direction of the ends of the magnets. The normal position of the resilient arm 31 is so that the catch 32 will be positioned within the path of the arms 7' and 9 to be engaged by said arms when they are raised to support the direction indicating symbols in a signaling position. The catch 32 engages the arms when in an upward position to support the direction indicating symbols in a signaling position and when it is desired to release the direction indicating symbols from this position, the magnets 30 are energized causing the resilient arm 31 to move the catch 32 from an engagement with either of the arms 7' or 9 to allow the respective direction indicating symbols thereon to return to their normal position or into engagement with the base.

A suitable signal 35 such as a light of the electric type or a bell is located upon the dash of the automobile in clear view of the operator and is electrically connected with the resilient arm 31 which acts as a circuit closer when either of the arms 7' or 9 are moved upwardly to cause the direction indicating symbols to move into signaling position, a circuit will be closed to the signal 35 through either of the arms 7' or 9 and through the casing, which will be more fully hereinafter described to operate the signal 35 thereby notifying the operator of the automobile that the direction indicating symbols are correctly operated.

A lamp support 36 is secured to the base 1 intermediate its ends and at the rear edge thereof and has secured to its upper end an electric lamp socket 38 for receiving an electric lamp 39 for illuminating the direction indicating symbols within the casing. A suitable reflector 40 is secured to the upper end of the lamp support 36 and partially incloses the electric lamp 39 for directing the rays of light therefrom outwardly through the window 3.

A battery 41 is connected to a conductor 42 which has connected thereto conductors 43, 44, 45 and 46. The conductors 43 and 44 extend through an electrical connection 47 and the conductors 45 and 46 extend through an electrical connection 48. A conductor 49 is connected through the electrical connection 47 to the conductor 43 and is in turn connected to the solenoid 14. A conductor 50 is connected to the solenoid 14 and to a push button 51 adapted to be located upon the dash of the automobile in convenient reach of the operator. A conductor 52 is connected to the push button 51 and to a ground 53 which is in turn connected to the battery 41 by a conductor 54. By closing the push button 51, the solenoid 14 will be energized by the electrical current received from the battery 41 which will cause the symbol 8 to swing upwardly in rear of the window 3 to indicate to the traffic that the operator intends to make a turn to the right. A conductor 55 is connected to the conductor 44 through the electrical connection 47 and is in turn connected to the solenoid 16. A conductor 56 is connected to the solenoid 16 and to a push button 57 located upon the dash of the automobile. A conductor 58 is connected to the push button 57 and to the ground 53. By closing the circuit to the push button 57, the solenoid 16 will be energized, causing the direction indicating symbol 11 to swing upwardly in rear of the window 3 to notify the traffic that the operator of the automobile intends to make a turn to the left. A conductor 59 is connected to the conductor 45 through the electrical connection 48 and is in turn connected to a push button 60. A conductor 61 is connected to the push button 60 and to the pair of magnets 30. A conductor 62 is connected to the pair of magnets and to the ground 53. Thus it will be seen that by closing the circuit through the push button 60, the magnets will be energized, attracting the resilient arm 31, releasing either of the arms 7 or 9 to return the direction indicating symbols to their non-signaling position, or into an engagement with the base 1. A conductor 63 is connected to the conductor 46 through the electrical connection 48 and to a switch 64. A conductor 65 is connected to the switch 64 and to the electric lamp 39. A conductor 66 is connected to the electric lamp 39 and to the ground 53. Thus it will be seen that by closing the circuit through the switch 64, the electric lamp 39 will be illuminated to display the direction indicating symbols 8 or 11 within the casing. If desired the lamp 39 may be placed in circuit with the tail light now used upon automobiles, thus when the tail light is illuminated the lamp 39 will be illuminated to show or display the direction indicating symbols at night. A conductor 67 is connected to the conductor 63 and to the signal 35 located upon the dash of the automobile. A conductor 68 is connected to the signal 35 and to the contact finger 34 carried by the resilient arm 31. When the arm 7' is swung upwardly to display the direction indicating symbol 8 and held in a signaling position by the catch 32, the signal 35 will be operated by the current flowing through the conductors 67, and 68 through the arm 7' and the conductor 69 which is in turn connected to the ground 53. When the arm 9 is swung upwardly to display the direction indicating symbol 11 the circuit will be closed through the signal 35 to the conductors 67 and 68 through the contact finger 34, the arm 9 and through a conductor 70 which is in turn connected with the ground 53. Thus it will be seen when either of the direction indicating symbols are moved to a signaling position, the signal 35 will be operated to inform the operator of the automobile that the direction indicating symbols are correctly operated.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A direction indicator comprising a base, a casing secured to said base and having an opening therein, standards secured to said base, a rod connecting said standards together, arms journaled on said rod, direction indicating symbols carried by said arms, means for swinging the arms upwardly to move the direction indicating symbols into signaling position rearwardly of the opening of the casing, a spring arm secured to the base, a rectangular plate carried by the arm, magnets carried by the plate, a resilient arm carried by said plate and overlying the magnets, a contact finger formed on said resilient arm, a catch formed on said resilient arm adapted to engage the first mentioned arm when swung upwardly to move the direction indicating symbols into signaling position for holding said direction indicating symbols in a signaling position, and a signal operatively connected with the contact of the resilient arm adapted to be operated upon the movement of the direction indicating symbols into signaling position.

2. A direction indicator comprising a base, a casing secured to said base and having an opening therein, standards secured to said base, arms journaled to said standards, direction indicating symbols carried by said arms, solenoids pivotally secured to the base at one end thereof, cores slidably mounted in said solenoids, means for operatively connecting the cores to the arms, means for energizing the solenoids to attract the cores to swing the arms upwardly to move the direction indicating symbols into signaling position, and leaf springs secured to the base and in engagement with the free ends of the solenoids to raise the free ends of the solenoids upwardly upon the movement of the direction indicating symbols into signaling position to reduce the strain and friction upon the cores.

In testimony whereof I affix my signature in presence of two witnesses.

MELVIN COLBY.

Witnesses:
  Isaac Fosshage,
  Carl Colby.